March 17, 1925.
D. H. BRADLEY
COUPLING FOR AXLES
Filed Oct. 28, 1921
1,529,941
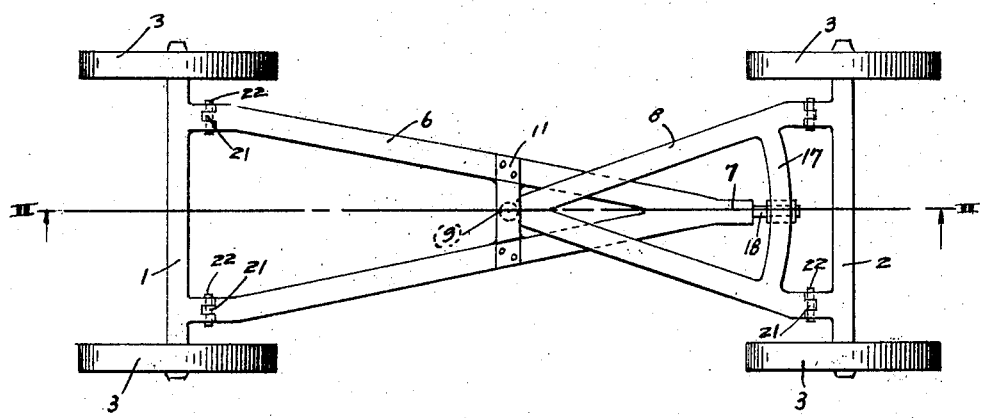
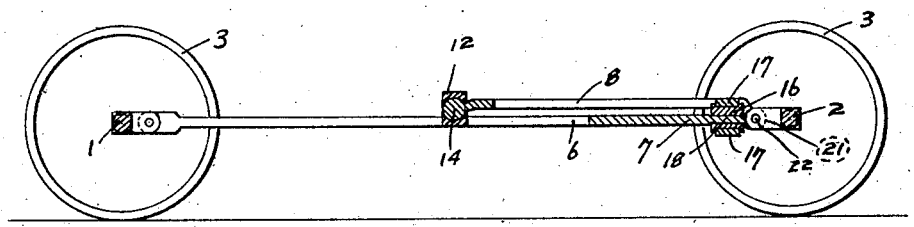
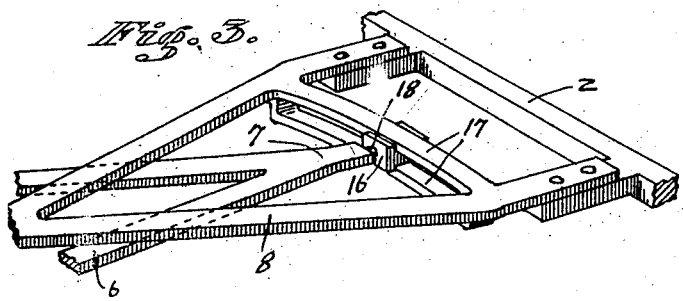
Inventor
DURBIN H. BRADLEY
By
Attorneys.

Patented Mar. 17, 1925.

1,529,941

UNITED STATES PATENT OFFICE.

DURBIN H. BRADLEY, OF SUNNYVALE, CALIFORNIA.

COUPLING FOR AXLES.

Application filed October 28, 1921. Serial No. 511,141.

*To all whom it may concern:*

Be it known that I, DURBIN H. BRADLEY, a citizen of the United States, and a resident of Sunnyvale, county of Santa Clara, and State of California, have invented a new and useful Coupling for Axles, of which the following is a specification.

The present invention relates to improvements in couplings for vehicle axles and its particular object is to provide a coupling for two vehicle axles which will cause the wheels supporting the axles to follow the same track. The invention relates to axles generally and is not intended to be confined to two axles forming the chassis of a single vehicle but may be used as well for connecting the front axle of one vehicle to the rear axle of another vehicle for towing purposes. Neither is my invention confined to the connection of two axles but may be successfully used for the successive connection of a large plurality of axles such as might be used, for instance, in connecting the different axles constituting a train of wagons or trucks. If all the axles are connected one to the other by means of my coupling device herein disclosed the wheels will all trail each other no matter whether the train of vehicles follows a straight or a curved road or turns around a corner.

A further object of my invention is the combination with this coupling of a device for allowing oscillating motion of each individual axle in a vertcal plane so that when an individual wheel drops into a hole or passes over a rock, its rise or fall will not affect the tracking of the other wheels nor will such a motion subject this coupling to undue strain.

With these objects in view I have illustrated the preferred form of my invention in the accompanying drawing, in which Figure 1 illustrates a top plan view of my coupling; Figure 2 a vertical cross section through the same along line 2—2 of Figure 1, and Figure 3 a perspective view of a portion of my coupling in a slightly modified form. While this drawing presents the preferred form of my device, I wish to have it understood that the principle underlying my invention can be embodied in many different forms, and I do not want to confine myself in any manner to the particular form illustrated in the drawing and described in the following specification.

The two axles (1) and (2) may be considered as being the front and rear axles of one vehicle or as being the rear axle of one vehicle and the front axle of a second vehicle to be towed by the former. Each axle is supported on a pair of wheels (3). The axle (1) is provided with a frame (6) which is illustrated in the drawing as forming a triangle with the axle, the apex (7) of the triangle pointing toward the axle (2). The latter is also provided with a substantial triangular frame (8), the apex (9) of which points toward the axle (1). The frame (6) has secured thereto a cross member (11) preferably arranged in such a manner that the socket (12) secured thereto lies on the longitudinal center line of the vehicle and substantially midway between the two axles. This socket is intended to receive the ball (14) secured to the apex of the frame (8) so that by this ball and socket joint the two frames (6) and (8) are joined together with freedom of pivotal motion. This motion is limited to a horizontal plane, however, by means of the slide (16) at the apex (7) engaging the horizontal guide way (17) secured in the frame (8). The slide (16) is secured to the apex (7) by means of a pin (18) extending forwardly from the apex and extending through a registering perforation in the slide (16). Since the pin (18) is allowed to rotate in the slide (16) it will be seen that this connection allows of a rocking motion of either axle in a vertical plane without affecting the other axle.

The frames (6) and (8) may be secured to their respective axles either rigidly as shown in Figure 3 or by means of hinges (21) swinging on horizontal pivots (22).

In operation it will be seen that when the front axle, which we may assume in this particular case to be the axle (2), is turned to the right to follow the curve of the road, the apex (9) will be thrown to the left and will force the frame (6) into such a direction that the rear wheels (3) will follow the track made by the front wheels. If one of the wheels passes over a rock and is lifted thereby, the axle supported in the wheel is allowed to rock without affecting any of the other axles by means of the pivotal connection (9) as well as (18). It will be understood that the joint at (9) does not necessarily have to be a ball and socket joint but that any joint will answer the purpose if it allows of pivotal motion in a horizontal plane, and of a slight rocking motion. It is also understood that the slide (18) can be replaced by a number of different forms, as, for instance, by a roller traveling in the guide way 17.

I claim:

1. A coupling for vehicle axles comprising two members secured to the axles, a universal pivotal connection between the two members and a prolonged tongue on one member having a pivotal sliding connection with the other member allowing of oscillating motion of either axle relative to the other on the axis of the two pivotal connections.

2. A coupling for vehicle axles comprising two members secured to the axles, a universal pivotal connection between the two members; a prolonged tongue on one member and a quadrant formed integral with the other member having a sliding element therein adapted to be pivotally engaged by the tongue so as to allow of an oscillating motion of either axle relative to the other on the axis of the two pivotal connections.

DURBIN H. BRADLEY.